US012086281B2

(12) United States Patent
Rallapalli et al.

(10) Patent No.: US 12,086,281 B2
(45) Date of Patent: Sep. 10, 2024

(54) UNSTRUCTURED DATA ACCESS CONTROL

(71) Applicant: KYNDRYL, INC., New York, NY (US)

(72) Inventors: Murthy Rallapalli, Alpharetta, GA (US); Jerry Michael Denman, Taylors, SC (US); Prabhakar Attaluri, Aurora, IL (US)

(73) Assignee: Kyndryl, Inc., New York, NY (US)

( * ) Notice: Subject to any disclaimer, the term of this patent is extended or adjusted under 35 U.S.C. 154(b) by 113 days.

(21) Appl. No.: 17/211,948

(22) Filed: Mar. 25, 2021

(65) Prior Publication Data

US 2022/0309181 A1    Sep. 29, 2022

(51) Int. Cl.
| | |
|---|---|
| G06F 21/62 | (2013.01) |
| G06F 16/38 | (2019.01) |
| G06F 21/31 | (2013.01) |
| G06F 21/60 | (2013.01) |

(52) U.S. Cl.
CPC .......... *G06F 21/6227* (2013.01); *G06F 16/38* (2019.01); *G06F 21/31* (2013.01); *G06F 21/602* (2013.01); *G06F 2221/2141* (2013.01)

(58) Field of Classification Search
CPC ...... G06F 21/6227; G06F 16/38; G06F 21/31; G06F 21/602; G06F 2221/2141
See application file for complete search history.

(56) References Cited

U.S. PATENT DOCUMENTS

| | | | |
|---|---|---|---|
| 8,347,088 B2 | 1/2013 | Moore | |
| 8,874,552 B2 | 10/2014 | Jehuda | |
| 9,734,169 B2 | 8/2017 | Redlich | |
| 10,043,035 B2 | 8/2018 | Lafever | |
| 10,181,049 B1 * | 1/2019 | El Defrawy | ............ H04L 9/085 |
| 10,404,757 B1 | 9/2019 | Horton | |
| 10,803,197 B1 * | 10/2020 | Liao | ...................... G06F 21/604 |
| 2012/0284259 A1 | 11/2012 | Jehuda | |
| 2014/0068265 A1 * | 3/2014 | Irwin | .................... H04L 63/123 |
| | | | 713/168 |

(Continued)

OTHER PUBLICATIONS

"Accelerating Audits with Automation: Who's Accessing Your Unstructured Data?", Copyright 2009 by Varonis Systems, 7 pages.

(Continued)

*Primary Examiner* — Vance M Little
*Assistant Examiner* — Alan L Kong
(74) *Attorney, Agent, or Firm* — Dan Housley; Andrew M. Calderon; Calderon Safran & Wright P.C.

(57) ABSTRACT

A method for protecting individual data elements within an unstructured dataset includes identifying a data element within the unstructured dataset requiring access control, encrypting the data element within the unstructured dataset, storing a decryption key and access control information corresponding to the dataset at an access controller, and cryptographically binding the encrypted data element to metadata that identifies the access controller. The method may additionally include detecting an access attempt to the dataset, and determining whether the access attempt is acceptable according to the access control information. If the access attempt is acceptable, the method may further include allowing the access attempt. If the access attempt is not acceptable, the method may further include denying the access attempt.

17 Claims, 3 Drawing Sheets

(56) References Cited

U.S. PATENT DOCUMENTS

| | | | |
|---|---|---|---|
| 2015/0096053 A1* | 4/2015 | Negrea | G06F 21/6209 |
| | | | 726/28 |
| 2016/0148021 A1* | 5/2016 | Wong | G06F 21/78 |
| | | | 713/193 |
| 2017/0104762 A1* | 4/2017 | Feng | G06F 21/6227 |
| 2017/0243028 A1 | 8/2017 | Lafever | |
| 2021/0200881 A1* | 7/2021 | Joshi | G06F 21/6218 |
| 2022/0052835 A1* | 2/2022 | Eldefrawy | H04L 9/0819 |

OTHER PUBLICATIONS

"What is Homomorphic Encryption?—Hashed Out by The SSL Store™", Jun. 20, 2019, 9 pages, <https://www.thesslstore.com/blog/what-is-homomorphic-encryption/>.

Disclosed Anonymously, "A system and method to protect and control distributed data versions", An IP.com Prior Art Database Technical Disclosure, IP.com No. IPCOM000264058D, IP.com Electronic Publication Date: Nov. 6, 2020, 11 pages.

Disclosed Anonymously, "Centralized role based access control management system based on OAuth and Blockchain", An IP.com Prior Art Database Technical Disclosure, IP.com No. IPCOM000252233D, IP.com Electronic Publication Date: Dec. 29, 2017, 6 pages.

Disclosed Anonymously, "Method to customize token usage handling and revocation", An IP.com Prior Art Database Technical Disclosure, IP.com No. IPCOM000230655D, IP.com Electronic Publication Date: Aug. 29, 2013, 2 pages.

King, Timothy, "80 Percent of Your Data Will Be Unstructured in Five Years", posted on Mar. 28, 2019, 4 pages, <https://solutionsreview.com/data-management/80-percent-of-your-data-will_be_unstructured_in_five_years>.

* cited by examiner

UNSTRUCTURED DATA ACCESS CONTROL

BACKGROUND

The present invention relates generally to the field of information security & privacy, and more specifically to protecting individual data elements.

With the advent of exponential e-commerce growth, there is a tremendous growth in the collection of unstructured data across the enterprises. Enterprises have developed methods for protecting data in a structured format using encryption at data-at-rest and in-transit. While structured data is stored in a data store with required encryptions and monitoring, unstructured data is protected at dataset level. Many cloud providers use a cloud-based storage called Cloud Object Store, or COS. COS elements are unstructured data elements such as images, text files, configuration files, and the like. According to some projections, as much as 80% of worldwide data may be unstructured by 2025. Email messages, word processing documents, videos, photos, audio files, presentations, webpages, and many other types of business documents are all examples of unstructured data contributing to this increase in unstructured data prominence.

SUMMARY

As disclosed herein, a computer implemented method for protecting individual data elements within an unstructured dataset includes identifying a data element within the unstructured dataset requiring access control, encrypting the data element within the unstructured dataset, storing a decryption key and access control information corresponding to the dataset at an access controller, and cryptographically binding the encrypted data element to metadata that identifies the access controller. The method may additionally include detecting an access attempt to the dataset, and determining whether the access attempt is acceptable according to the access control information. If the access attempt is acceptable, the method may further include allowing the access attempt. If the access attempt is not acceptable, the method may further include denying the access attempt. A computer program product and computer system corresponding to the method are also disclosed.

DETAILED DESCRIPTION

When a dataset is encrypted, it is done at the dataset level. If an unstructured dataset has only two protected elements, as a protection mechanism, the entire data set is encrypted in a blanket encryption mechanism. When said dataset is decrypted and copied, or moved to a different location, it may not be necessary for all encryption attributes to be moved or copied along with it. Embodiments of the present invention provide a mechanism for protecting sensitive data elements in an unstructured data format throughout the life cycle of said data elements, regardless of whether the data elements or moved or copied, etc.

The present invention will now be described in detail with reference to the Figures. Implementation of embodiments of the invention may take a variety of forms, and exemplary implementation details are discussed subsequently with reference to the Figures.

Figure 1:
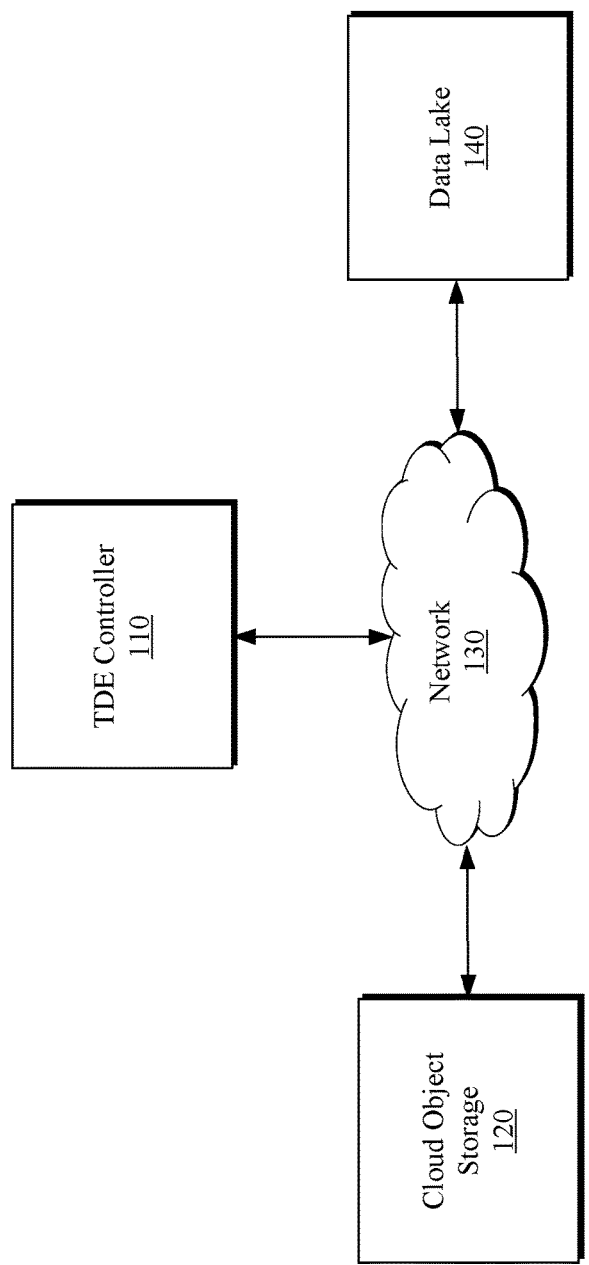
FIG. 1 is a block diagram depicting an access control system in accordance with at least one embodiment of the present invention.

FIG. 1 is a block diagram depicting an access control system 100 in accordance with at least one embodiment of the present invention. As depicted, access control system 100 includes TDE controller 110, cloud object storage 120, network 130, and data lake 140. Access control system 100 may enable improved control over access to protected unstructured data elements.

TDE controller 110 can be responsible for creating Trusted Data Elements (TDE) in a protected table. A trusted data element is an encrypted data element of an unstructured data store. In at least some embodiments, a trusted data element is encapsulated and cryptographically bound to meta data that can be used at the time of consumption to determine the entitlement based on the user. For example, if an unstructured data store has an element (SSN), a corresponding trusted data element may be created for the SSN. This TDE corresponding to the SSN can only be unlocked by the TDE controller using cryptographically bound keys. In at least some embodiments, a TDE is an encrypted data element plus corresponding metadata. The TDE may be encrypted using a specific key, and required instructions on how to open and identify the TDE are included in the metadata. In at least some embodiments, at data target, TDE controller 110 is configured to open up a TDE and examine a user entitlement to determine whether a user is entitled to access or not. In at least some embodiments, TDEs are created only for confidential elements that need to be protected. In at least some embodiments, all user access to the TDEs is facilitated via TDE controller 110. TDE controller 110 may be configured to leverage logic elements, key material, and policy, and may additionally dynamically update policy to revoke user access to data.

In at least some embodiments, TDE controller 110 protects a data element via a unique access control mechanism that enables access to always remain with the TDEs, regardless of where they may be sent. TDE security stays with the elements as metadata whether they are copied, duplicated, copied, or sent as attachments, etc. In embodiments as described, access to the TDEs is facilitated through the TDE controller only; in other words, the TDE controller receives a request to access a TDE data element, and determines whether the user has access to the TDE according to the user's entitlements.

Cloud object storage 120 can be a computer data storage architecture that manages data as objects, as opposed to other storage architectures like file systems which manage data as file hierarchies or block storage which manages data as blocks within sectors and tracks. In at least some embodiments, an object within cloud object storage 120 includes data itself, a variable amount of corresponding metadata, and a globally unique identifier. In at least some embodiments, cloud object storage 120 is implemented at multiple levels, such as the device level (object-storage level), the system level, at a cloud service level, and the interface level. In each implementation, cloud object storage 120 may enable capabilities not addressed by other storage architectures, such as data-management functions like data replication and data distribution at object-level granularity. In general, cloud object storage 120 can be any storage architecture in which data is stored and managed as objects.

Network 130 can be, for example, a local area network (LAN), a wide area network (WAN) such as the Internet, or a combination of the two, and include wired, wireless, or fiber optics connections. In general, network 143 can be any combination of connections and protocols that will support communications between TDE controller 110, cloud object storage 120, and data lake 140.

Data lake 140 can be a system or repository of data stored in a natural or raw format, such as object blobs or files. In at least some embodiments, data lake 140 is a single store of data including raw copies of source system data, sensor data, social data, etc., and transformed data used for tasks such as reporting, visualization, advanced analytics, and machine learning. Data lake 140 may additionally include structured data from relational databases, semi-structured data, unstructured data, and binary data. In some embodiments, data lake 140 is established on premises within an organizations data centers; in other embodiments, data lake 140 is established in the cloud.

Figure 2:
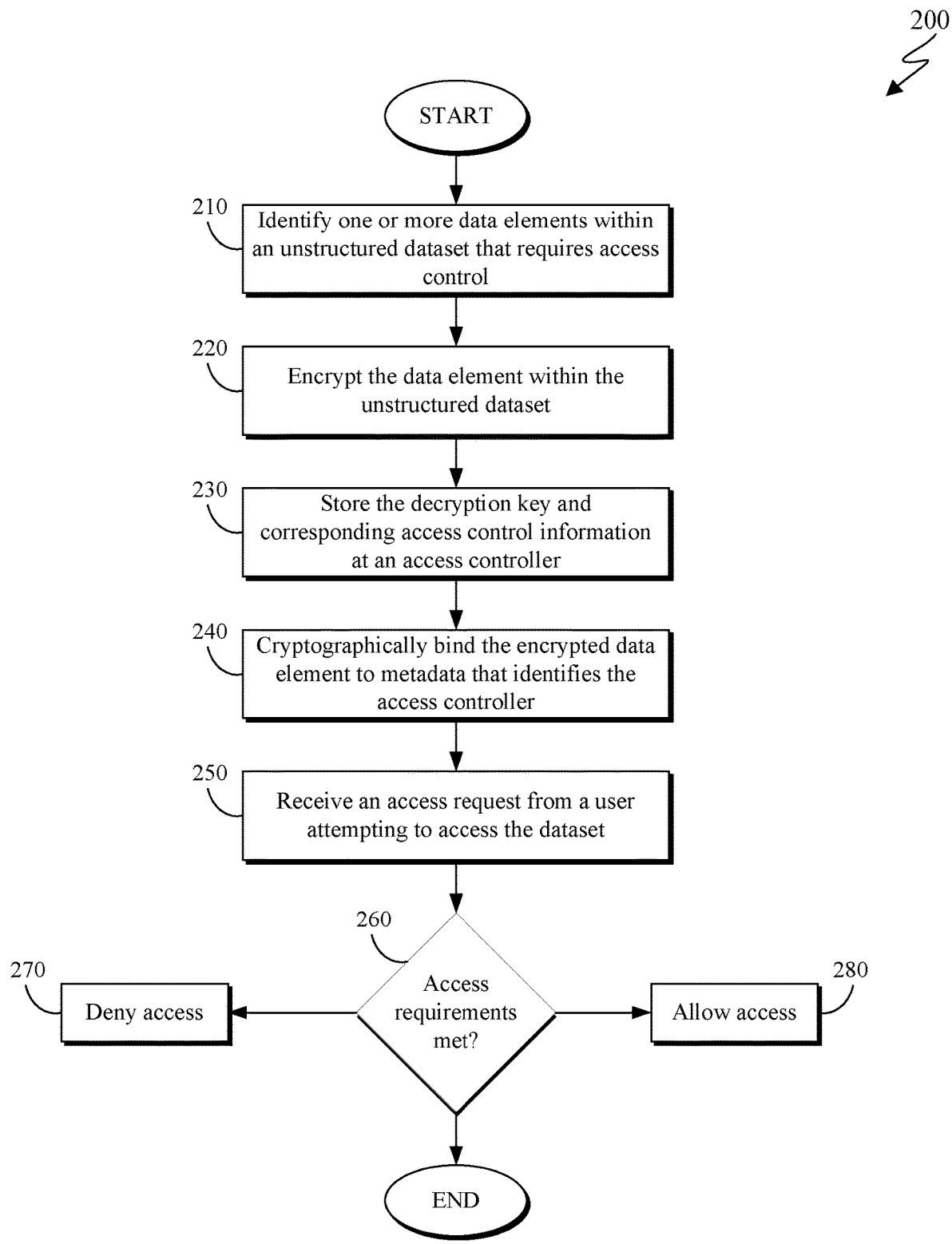
FIG. 2 is a flowchart depicting an access control method in accordance with at least one embodiment of the present invention.

FIG. 2 is a flowchart depicting an access control method 200 in accordance with at least one embodiment of the present invention. As depicted, access control method 200 includes identifying (210) one or more data elements within an unstructured dataset that require access control, encrypting (220) the one or more data elements, storing (230) the decryption key and corresponding access control information at an access controller, cryptographically binding (240) the encrypted data element to metadata that identifies the access controller, receiving (250) an access request from a user attempting to access the dataset, determining (260) whether access requirements are met, denying (270) access, and allowing (280) access. Access control method 200 may enable increased access security with respect to unstructured data elements.

Identifying (210) one or more data elements within an unstructured dataset that require access control may include receiving a dataset comprising one or more data elements. In some embodiments, the received dataset may comprise entirely of unstructured data. In other embodiments, the received dataset includes a combination of structured and unstructured data elements. In at least some embodiments, identifying (210) one or more data elements within an unstructured dataset includes identifying data elements within the unstructured dataset that include or correspond to protected or sensitive information (personal information, social security numbers, credit card information, etc.).

Encrypting (220) the one or more data elements may include leveraging any number of known encryption techniques to encrypt the identified data elements, thereby protecting the information. Generally, encrypting (220) the one or more data elements refers to the process of encoding the information in the data elements by converting the plaintext into an alternative ciphertext via the use of an encryption key. Encrypting (220) the one or more data elements may additionally include generating a set of access information corresponding to the encrypted data elements. In at least some embodiments, the access information indicates a set of conditions a user must meet before being given access to the encrypted data elements.

Storing (230) the decryption key and corresponding access control information at an access controller may include identifying a controller configured to manage access to the identified data elements. In embodiments where a controller is not assigned, storing (230) the decryption key includes assigning a controller to manage all access to the identified data elements. The assigned controller may be configured to manage any and all access to the data elements to which it is assigned, including the previously identified data elements. In some embodiments, storing (230) the decryption key and corresponding access control information includes storing necessary information for decrypting and accessing the identified data elements at a data controller such that said data controller may ultimately manage all access to the data elements.

Cryptographically binding (240) the encrypted data element to metadata that identifies the access controller may include leveraging any number of cryptographic binding techniques to associate the encrypted data element with the corresponding access controller. The data element and metadata are cryptographically bound using industry standard AES256 using data encryption keys that are all user defined and not generated dynamically. These keys are stored in keystores and protected internally in the key hierarchy.

Receiving (250) an access request from a user attempting to access the dataset may include receiving a notification or an indication from a computing system that a user is attempting to access one of the one or more identified data elements. In at least some embodiments, a user requests access to a data element or dataset directly via the controller. In other embodiments, a user may request access to the data element or dataset via an external resource. In said embodiments, said external resource or system is configured to notify the controller of the access request.

Determining (260) whether access requirements are met may include analyzing the user's credentials to determine whether the user meets criteria required to access the data element. In embodiments where the access attempt is received directly via the controller, the controller itself extracts user access information. In other embodiments where the access attempt is executed via an external system or resource, the controller may be configured to query said external system or resource for the user information necessary to validate the user. In yet other embodiments, the user access information may be provided simultaneously with the user's access attempt. If it is determined that the user does not meet the access requirements (260, no branch), the method continues by denying (270) access. If it is determined that the user does meet the access requirements (260, yes branch), the method continues by allowing (280) access.

Denying (270) access may include taking measures to prevent the user from accessing the requested data element or dataset. In embodiments wherein the access attempt has occurred directly via the controller, denying (270) access includes directly denying the user from accessing the data element or dataset. In embodiments wherein the access attempt has occurred on an external system or resource, denying (270) access includes sending a notification or instruction to said external system or resource indicating that the user is to be denied access to the data element. In general, denying (270) access may include any steps that ultimately result in the user's inability to access the data element or dataset. In some embodiments, denying (270) access may include only displaying an encrypted format to a user. Consider an example where a data custodian attempts to access a protected data element in an unstructured format. The data controller would identify the user as a data custodian, determine that as a data custodian, said user has only limited access rights, and subsequently either denies the user access entirely, or displays only the encrypted values to the user.

Allowing (280) access may include taking measures to enable the user to access the requested data element or dataset. In embodiments wherein the access attempt has occurred directly via the controller, allowing (280) access may include directly enabling the user to access the data element or dataset via an interface associated with the controller. In embodiments wherein the access attempt has occurred on an external system or resource, allowing (280) access may include sending a notification or instruction to said external system or resource indicating that the user is to be allowed access to the data element or dataset. In general, allowing (280) access may include any steps that ultimately result in the user's ability to access the data element or dataset. Consider an example where a user deemed the data owner wants to access a protected data element in an unstructured format. The data controller determines the entitlement of the data owner, and displays the actual values to the data owner by decrypting the data element according to the encryption information stored in the metadata.

Figure 3:
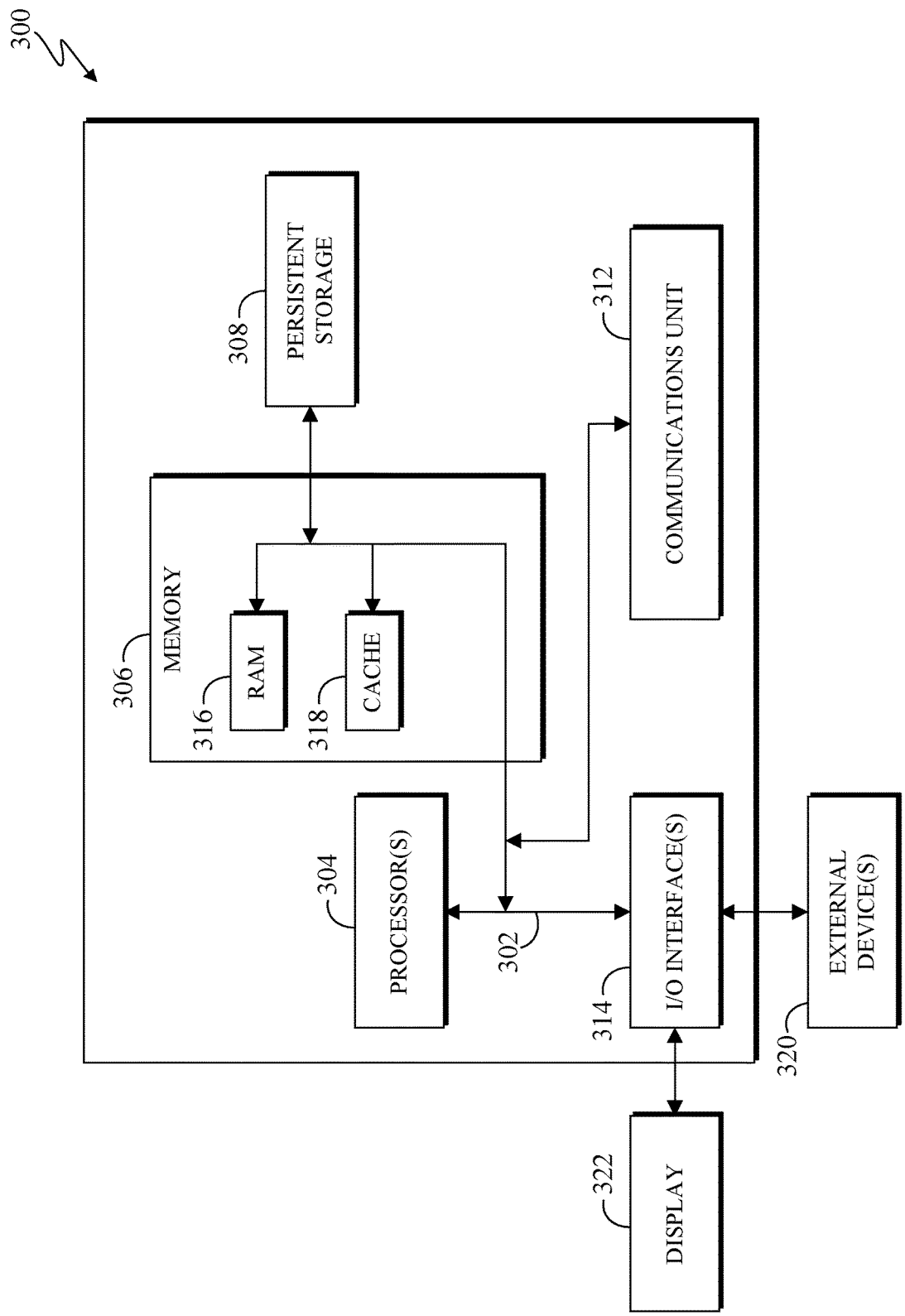
FIG. 3 is a block diagram of components of a computing system in accordance with an embodiment of the present invention.

FIG. 3 depicts a block diagram of components of computing system 110 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

As depicted, the computer 300 includes communications fabric 302, which provides communications between computer processor(s) 304, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 316 and cache memory 318. In general, memory 306 can include any suitable volatile or non-volatile computer-readable storage media.

One or more programs may be stored in persistent storage 308 for access and/or execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links.

I/O interface(s) 314 allows for input and output of data with other devices that may be connected to computer 300. For example, I/O interface 314 may provide a connection to external devices 320 such as a keyboard, keypad, a touch screen, and/or some other suitable input device. External devices 320 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 308 via I/O interface(s) 314. I/O interface(s) 314 also connect to a display 322.

Display 322 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for protecting individual data elements within an unstructured dataset, the method comprising:
    identifying a data element containing confidential information within the unstructured dataset requiring access control;
    encrypting the data element within the unstructured dataset comprising generating a trusted data element encrypted using a specific key, the trusted data element corresponding to the data element containing confidential information,
    wherein the trusted data element is encapsulated and cryptographically bound to metadata to determine an entitlement based on a user;
    storing a decryption key and access control information corresponding to the dataset at an access controller;
    cryptographically binding the encrypted data element to metadata that identifies the access controller,
    wherein the encrypted data element and the metadata are cryptographically bound using data encryption keys that are user defined, and the metadata comprises required instructions on how to open and identify the trusted data element; and
    receiving, by the access controller, an access request to access the encrypted data element.

2. The computer implemented method of claim 1, further comprising
    determining, by the access controller, whether the access request is acceptable according to the access control information.

3. The computer implemented method of claim 2, further comprising denying, by the access controller, the access request responsive to determining the access request is not acceptable according to the access control information.

4. The computer implemented method of claim 2, further comprising allowing, by the access controller, the access request responsive to determining the access request is acceptable according to the access control information.

5. The computer implemented method of claim 2, further comprising notifying an external system to allow access to the data element responsive to determining the access request is acceptable according to the access control information.

6. The computer implemented method of claim 2, further comprising notifying an external system to deny access to the data element responsive to determining the access request is not acceptable according to the access control information.

7. A computer program product comprising:
one or more computer readable storage media and program instructions stored on the one or more computer readable storage media, the program instructions comprising instructions to:
identify a data element within the unstructured dataset requiring access control, wherein an identified data element corresponds to a data element containing confidential information;
encrypt the data element within the unstructured dataset, wherein encrypting the data element comprises generating a trusted data element encrypted using a specific key, the trusted data element corresponding to the data element containing confidential information,
wherein the trusted data element is encapsulated and cryptographically bound to metadata to determine an entitlement based on a user;
store a decryption key and access control information corresponding to the dataset at an access controller;
cryptographically bind the encrypted data element to metadata that identifies the access controller, wherein the encrypted data element and the metadata are cryptographically bound using data encryption keys that are user defined, and wherein the metadata comprises required instructions on how to open and identify the trusted data element; and
receive an access request to access the encrypted data element, wherein the encrypting and the receiving are performed by the access controller.

8. The computer program product of claim 7, further comprising instructions to determine, by the access controller, whether the access request is acceptable according to the access control information.

9. The computer program product of claim 8, further comprising instructions to deny the access request responsive to determining the access request is not acceptable according to the access control information.

10. The computer program product of claim 8, further comprising instructions to allow the access request responsive to determining the access request is acceptable according to the access control information.

11. The computer program product of claim 8, further comprising instructions to notify an external system to allow access to the data element responsive to determining the access request is acceptable according to the access control information.

12. The computer program product of claim 8, further comprising instructions to notify an external system to deny access to the data element responsive to determining the access request is not acceptable according to the access control information.

13. A computer system comprising:
one or more computer processors;
one or more computer-readable storage media;
program instructions stored on the computer-readable storage media for execution by at least one of the one or more processors, the program instructions comprising instructions to:
identify a data element containing confidential information within the unstructured dataset requiring access control;
encrypt the data element within the unstructured dataset, wherein encrypting the data element comprises generating a trusted data element encrypted using a specific key, the trusted data element corresponding to the data element containing confidential information,
wherein the trusted data element is encapsulated and cryptographically bound to metadata to determine an entitlement based on a user;
store a decryption key and access control information corresponding to the dataset at an access controller;
cryptographically bind the encrypted data element to metadata that identifies the access controller, wherein the encrypted data element and the metadata being cryptographically bound using data encryption keys that are all user defined, and wherein the metadata comprises required instructions on how to open and identify the trusted data element; and
receive an access request to access the encrypted data element, wherein the encrypting, the storing, and the receiving are performed by the access controller.

14. The computer system of claim 13, further comprising instructions to
determine, by the access controller, whether the access request is acceptable according to the access control information.

15. The computer system of claim 14, further comprising instructions to deny the access request responsive to determining the access request is not acceptable according to the access control information.

16. The computer system of claim 14, further comprising instructions to allow the access request responsive to determining the access request is acceptable according to the access control information.

17. The computer system of claim 14, further comprising instructions to notify an external system to allow access to the data element responsive to determining the access request is acceptable according to the access control information.

* * * * *